US005719453A

United States Patent [19]
Horst

[11] Patent Number: 5,719,453
[45] Date of Patent: Feb. 17, 1998

[54] 2-ON COIL ARRANGEMENT FOR A SWITCHED RELUCTANCE MOTOR

[75] Inventor: Gary E. Horst, St. Louis County, Mo.

[73] Assignee: Emerson Electric Co., St. Louis, Mo.

[21] Appl. No.: 710,738

[22] Filed: Sep. 20, 1996

Related U.S. Application Data

[63] Continuation of Ser. No. 251,090, May 31, 1994, abandoned.

[51] Int. Cl.$^6$ .................................................. H02K 11/00
[52] U.S. Cl. ........................ 310/68 R; 310/185; 310/179; 318/42; 318/716
[58] Field of Search ............................. 310/49 R, 68 R, 310/68 B, 166, 168, 179, 185, 188; 318/701, 716, 418, 42

[56] References Cited

U.S. PATENT DOCUMENTS

| | | | |
|---|---|---|---|
| 3,688,306 | 8/1972 | Oishi et al. | 340/347 P |
| 4,995,159 | 2/1991 | Hancock et al. | 29/596 |
| 5,256,923 | 10/1993 | Bartos et al. | 310/166 |

FOREIGN PATENT DOCUMENTS

| 4127861 | 4/1992 | Japan | 310/166 |
|---|---|---|---|

OTHER PUBLICATIONS

IBM Technical Disclosure Bulletin, vol. 18 No. 1 Jun. 1975.
English Translation of Japanese Patent 4-127861, Dec. 1996.

*Primary Examiner*—Steven L. Stephan
*Assistant Examiner*—Jonathan Dystc Link
*Attorney, Agent, or Firm*—Polster, Lieder, Woodruff & Lucchesi

[57] ABSTRACT

Apparatus controlling switching of a polyphase switched reluctance motor (M). There is a set (10–16) of windings for each motor phase, each set of windings including at least two separate windings (10A, 10B–16A, 16B). One winding (10B) from one set (10) of windings is connected together with one (12A) winding from another set (12) of windings to form a combined set (10C) of windings. Each winding from the one set of windings is connected only to the one winding from the other sets of windings thereby to produce a number of combined sets of windings corresponding to the number of motor phases. A motor controller (18) selectively energizes and de-energizes the combined sets of windings in a predetermined sequence through an inverter (20). One switch (22a) operated by the inverter is interposed between the controller and one side of each of the combined sets of windings; and, a second switch (22b) is interposed between the inverter and the other side of each of the combined sets of windings. Closing the switches causes energization of windings in two of the motor phase so at least two motor phases are simultaneously energized at any time during motor operation.

17 Claims, 3 Drawing Sheets

2-ON COIL ARRANGEMENT FOR A SWITCHED RELUCTANCE MOTOR

This is a continuation application of application Ser. No. 08/251,090, filed on May 31, 1994, now abandoned.

BACKGROUND OF THE INVENTION

This invention relates to switched reluctance motors (SRM's) and more particularly, to a coil arrangement for such motors.

Switched reluctance motors are typically polyphase motors. While a motor can be a single phase motor, most such motors are 2, 3, 4, or 5 phase motors. In operation of a polyphase motor, control of the motor's phases includes controlling poles which line up at the same time. It is not uncommon in controlling phase switching for the motor two motor phases to be "on" at the same time. What this means is that energization of the respective coils or windings for each phase is independently controlled by separate portions of an inverter. This is accomplished by sequential switching between the respective motor phases.

Heretofore, each motor phase has an associated stator winding or set of winding coils. The inverter provides a switching arrangement by which switches on both sides of the winding or coil set are first closed when that phase becomes active, and then opened when the phase becomes inactive. Each set of switches for the respective phases are independently operated by the inverter. Accordingly, the overlapping of phases referred to above can occur. As is known in the art, sensing of various engine operating parameters is employed by a control circuit of the motor to effect phase switching. One of these parameters is rotor shaft position. To obtain this information, a shaft sensor such as a Hall effect sensor is mounted adjacent the shaft and the sensor provides an appropriate input to the control circuitry. Use of a shaft position sensor has certain drawbacks. They add cost to the motor, they take up space within the motor housing, and they can fail. Failure of a sensor effects the ability of the control circuit to provide the desired level of control wanted by the user.

An alternate method of shaft sensing involves inductance sensing. Inductance sensing is feasible under certain conditions; e.g., the level of saturation of the motor's backiron. Heretofore, the control of switching between the phases has not made this approach feasible. However, if an appropriate switching scheme were employed, it could be. This advantage would be in addition to requiring less current to energize the phase windings, even if two windings are simultaneously energized.

SUMMARY OF THE INVENTION

Among the several objects of the present invention may be noted the provision of a 2-phase "on" winding connection arrangement by which two phases of a polyphase switched reluctance motor having more than two phases which are energized at a particular time; the provision of such a phase winding connection in which windings from adjacent motor phases are connected together to form a combined set of windings; the provision of such a motor in which energization of one of the windings in the combined set causes energization of the other winding so two phases are energized at the same time; the provision of such a motor in which energization of two phases requires less current than conventional designs because windings for two phases are interconnected in the same circuit path rather than separate paths as was previously done; the provision of such a motor winding connection to localize the motor flux in the two motor phases whose windings are energized so the backiron on the other two phases is substantially unsaturated; the provision of such a motor winding connection by which the unsaturated portion of the motor backiron can be used to inductively sense rotor position; the provision of apparatus to control energization of the combined sets of motor windings; the provision of such apparatus which is responsive to sensed motor operating parameters such as rotor position to control switching between the various combined sets of windings; the provision of apparatus which enables more poles to be turned "on" and "off" with the same current for the normal forces produced within the motor to be better distributed through the backiron; and, the provision of such apparatus in which motor connections are readily made to produce the combined sets of windings.

In accordance with the invention, generally stated, apparatus is provided for controlling switching of a polyphase switched reluctance motor. There is a set of windings for each motor phase, each set of windings including at least two separate windings. One winding from one set of windings is connected together with one winding from another set of windings to form a combined set of windings. Each winding from the one set of windings is connected only to the one winding from the other sets of windings thereby to produce a number of combined sets of windings corresponding to the number of motor phases. A motor controller selectively energizes and de-energizes the combined sets of windings in a predetermined sequence. One switch is interposed between the controller and one side of each of the combined sets of windings; and, a second switch is interposed between the controller and the other side of each of the combined sets of windings. Closing the switches causes energization of windings in two of the motor phase so at least two motor phases are simultaneously energized at any time during motor operation. A method of motor operation is also disclosed. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
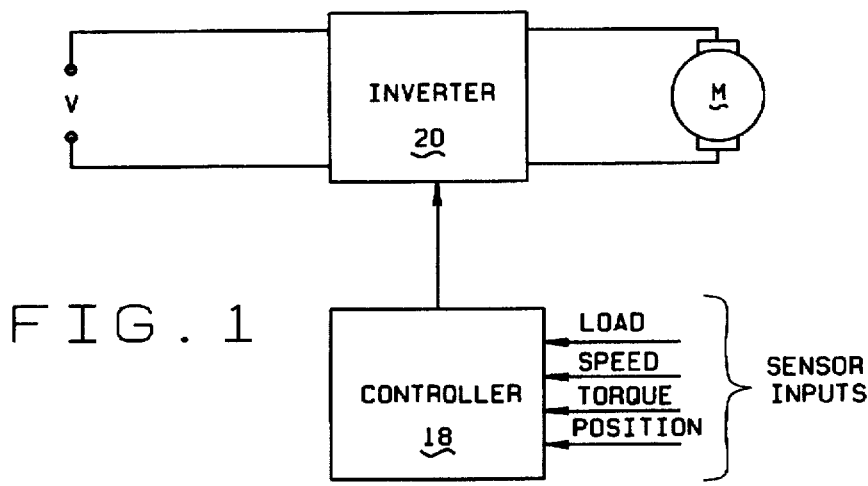
FIG. 1 is a block diagram of a switched reluctance motor and a controller therefore.
Figure 2:
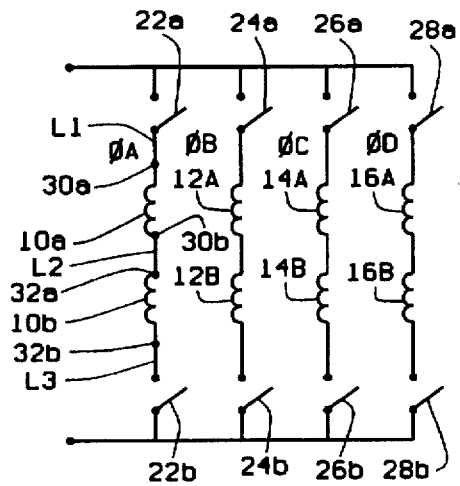
FIG. 2 is a schematic representing a prior art connection of stator windings of the motor.
Figure 4:
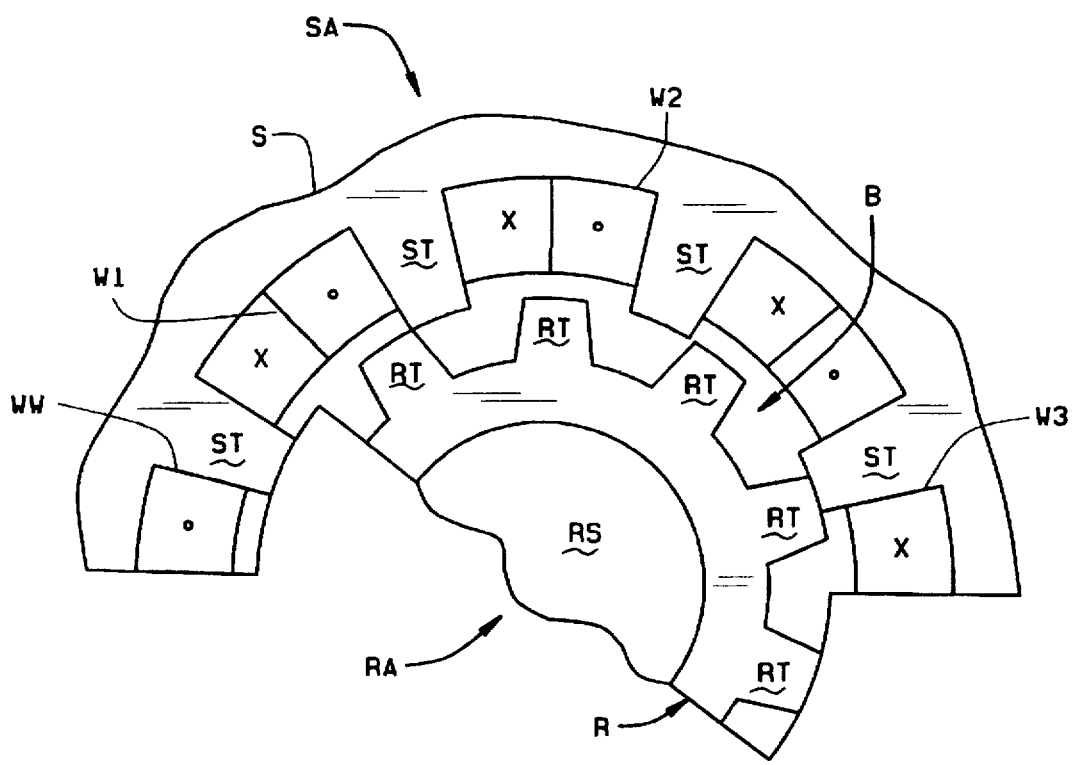
FIG. 4 is a partial sectional view of a prior art stator assembly and rotor of a motor illustrating current flow through windings of the stator.
Figure 5:
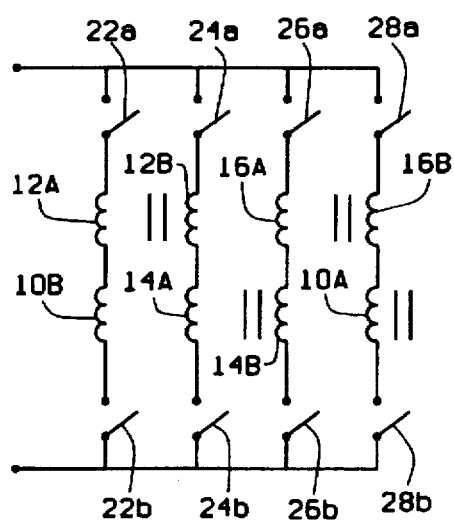
FIG. 5 is a schematic representing the connection of windings in accordance with the teachings of the present invention.
Figure 6:
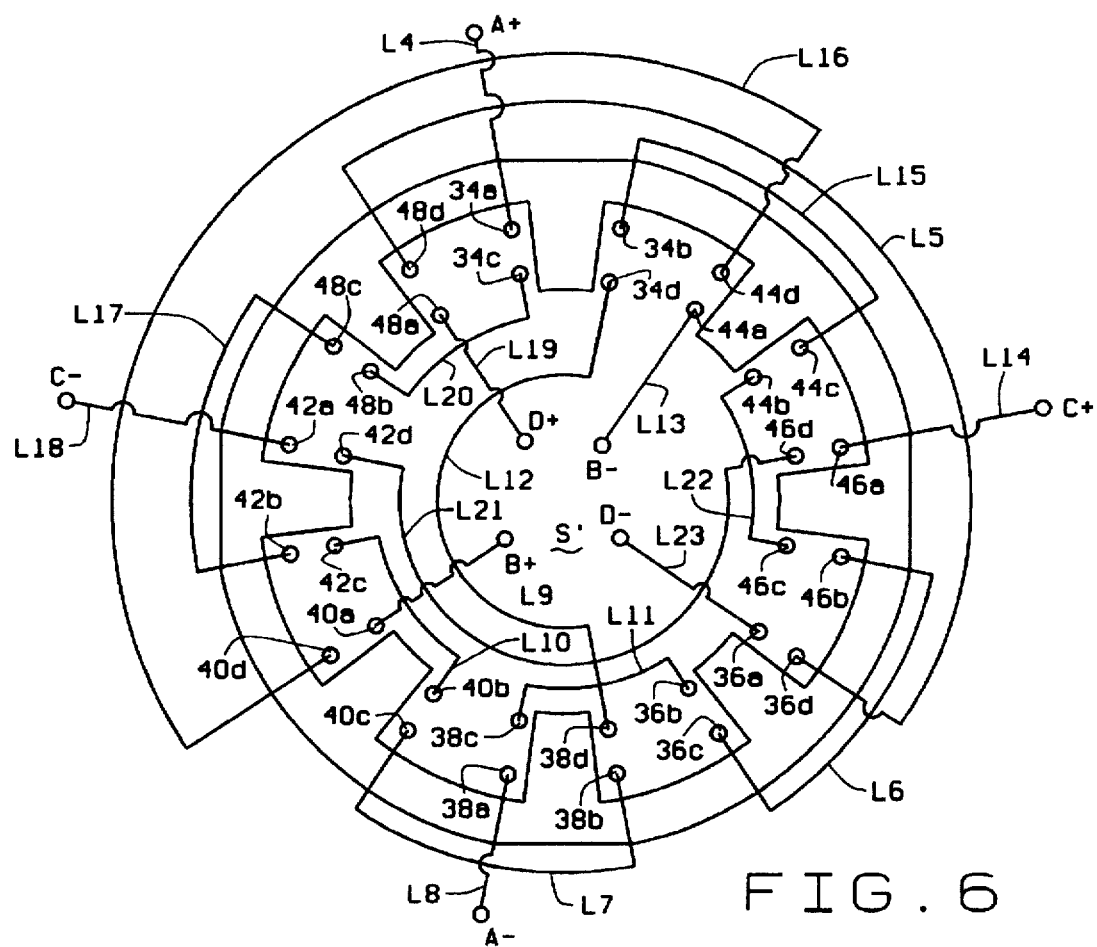
FIG. 6 is a connection diagram for the wiring configuration of FIG. 5.
Figure 7:
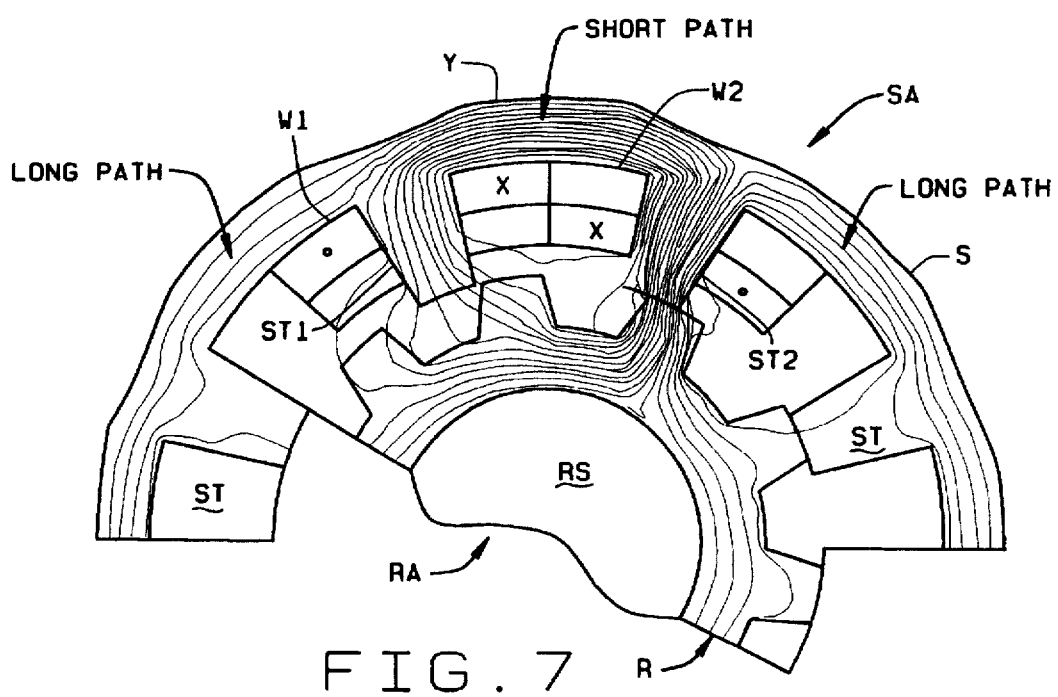
FIG. 7 is a partial sectional view of the motor similar to FIG. 4 and showing the flux paths through the backiron of the motor when wired in accordance with the present invention.

Referring to the drawings, a switched reluctance motor is indicated generally M in FIG. 1. Motor M is a polyphase switched reluctance motor having at least three phases; and, as shown in FIGS. 5 and 6, may, for s example, be a four phase motor having respective phases A, B, C, and D. Referring to FIG. 7, motor M includes a stator assembly SA with a stator S having a central bore B. The stator is formed with a plurality of salient teeth ST extending inwardly toward the bore and forming stator poles. A plurality of stator windings $W_1-W_n$ are installed on the stator teeth. In FIG. 2, it is seen that the stator windings comprise separate respective windings 10, 12, 14, and 16. It will be understood that each winding may comprise a set of windings because there are typically more than one stator pole per each motor phase and each pole has an associated winding (see FIG. 4). There is therefore one set of windings for each motor phase.

Still referring to FIG. 7, motor M further includes a rotor assembly RA. The rotor assembly has a rotor R installed on a rotor shaft RS which is disposed within bore B for rotation with respect to the stator assembly. Rotor R has a plurality of outwardly extending rotor teeth RT forming rotor poles.

As is well-known in the art, operation of a polyphase switched reluctance motor M includes selectively energizing the sets of stator windings for motor M to be switched from one motor phase to the next. Thus, a controller 18 is responsive to various motor operating parameters such as load, speed, torque, and rotor position to supply control signals to a switching unit 20 which is, for example, an inverter. Inverter 20 is connected to a power source V and the inverter selectively opens and closes switches to apply current and voltage inputs across a set of phase windings. Controller 18 and inverter 20 operate to switch the phases in a sequential manner such as A, B, C, D, A, etc. When phase A is energized, respective switches 22a, 22b are closed. These switches are at the respective input and output sides of winding set 10. When the motor is stepped to phase B, switches 22a, 22b are opened and switches 24a, 24b which are associated with winding set 12 are closed. The same sequence occurs when phase C is energized and switches 26a, 26b are closed and when switches 28a, 28b are closed to energize phase D. Also, it is typical to operate motor M such that each phase controls poles which line up at the same time. That is, when a rotor pole RT aligns with a stator pole ST. Further, because each set of switches is independently operated, it is possible for two motor phases to be simultaneously energized. However, because the phases are operated independently, this increases the amount of current required by the inverter to perform phase switching.

Figure 3:
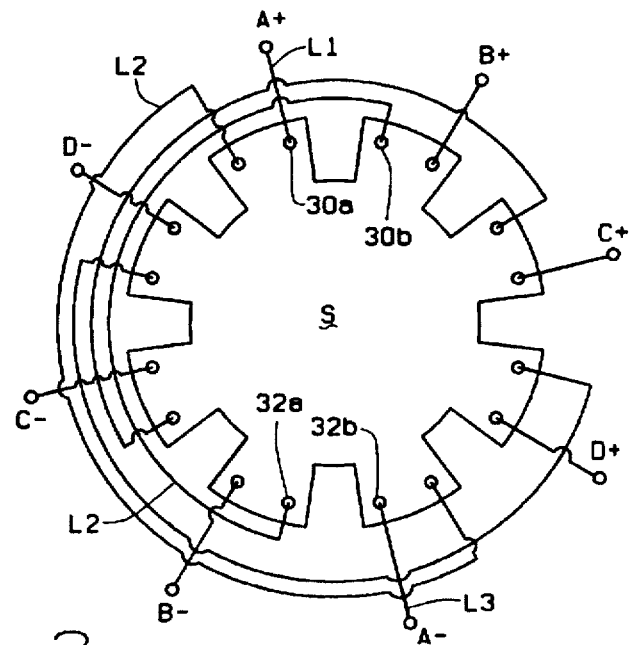
FIG. 3 is a connection diagram for the wiring configuration of FIG. 2.

Shown in FIG. 3, is the winding connection diagram for a four-phase motor M having an eight-pole stator S in which of each set of windings includes at least two windings. Thus, set 10 includes windings 10A and 10B, set 12 includes windings 12A, 12B, etc. An input line L1, for example, is routed from switch 22a to a terminal 30a which connects to one side of winding 10A. The other side of the winding connects to a terminal 30b. A line L2 extends between terminal 30b and a terminal 32a for the winding 10B of the winding set. This other side of this winding connects to a terminal 32b which connects to switch 22b. Because the winding sets are similarly connected to their respective switches, their connection will not be described.

The improvement of the present invention is shown in FIG. 5. As seen therein, one winding from one set of windings is connected together with one winding from another set of windings to form a combined set of windings. Thus, for example, winding 12A of winding set 12 is connected to winding 10B of set 10. Further, winding 12B is connected to winding 14A, winding 14B to winding 16A, and winding 16B to winding 10A. Each winding from the one set of windings is connected only to one other winding from the other set of windings, and the two windings are serially connected. Connecting together a winding from one set with a winding from another set produces resulting combined sets of windings 10C, 12C, 14C, 16C. The number of combined sets corresponds to the number of motor phases. And, the respective windings connected together to form the combined sets of windings are windings from adjacent motor phases. Thus the winding configuration is A-B, B-C, C-D, D-A.

The wiring configuration for this new arrangement is shown in FIG. 6. For a stator S', the termination sets do not include two terminals such as shown in FIG. 3, but four terminals. Now, for the combined set of windings 10C, a line L4 from one of the switches 22 connects to a terminal 34a. A second line L15 interconnects terminal 34b with a terminal 44c. Line L16 connects terminal 44d with a terminal 40d. Line L7 connects terminal 40c with terminal 38b. And, terminal 38a connects to the other switch 22 via line L8.

With respect to the combined set of windings 12B, 14A, a line L9 from one of the switches 24 connects to a terminal 40a. Terminal 40b connects to a terminal 42c via line L10; a line L21 connects terminal 42d to terminal 46d; a line L22 connects terminal 46c to a terminal 44b, and terminal 44a connects to the other switch 24 by a line L13. For the combined set of windings 14B, 16A, a line L14 from one of the switches 26 connects to a terminal 46a. Terminal 46b connects to a terminal 36c via line L6; a line L5 connects terminal 36d to terminal 48d; a line L17 connects terminal 48c to a terminal 42b, and terminal 42a connects to the other switch 26 by a line L18. Lastly, for the combined set of windings 16B, 10A, a line L19 from one of the switches 28 connects to a terminal 48a. Terminal 48b connects to a terminal 34c via line L20. A line L12 connects terminal 34d to terminal 38d; a line L11 connects terminal 38c to a terminal 36b, and a terminal 36a is connected to the other switch 28 by a line L23. These respective sets of wiring connections now effect the simultaneous energization of two adjacent motor phases when the appropriate set of switches are closed.

This new combination of winding connections has a number of advantages. First, even though, as noted, it has been previously possible to simultaneously energize more than one motor phase, applicant has provided apparatus and a method by which this is accomplished using but a single circuit. The apparatus and method of the present invention allow the adjacent, non-energized phases of the motor to act as a sensor for sensing rotor position. This allows a rotor position input for control means 18 to be produced without use of shaft position sensor such as a Hall-effect sensor, for example. As shown in FIG. 7, with two phase poles simultaneously activated, the coil arrangement shown in FIG. 5 produces short flux paths Y between the active, adjacent phase poles. In FIG. 7, the rotor and stator are shown at a position where a rotor pole is approximately 12° out of alignment with a stator pole. As is readily seen, the flux is localized on that portion of the motor backiron immediately adjacent the two phase poles for the phases which are energized; i.e. poles ST1 and ST2. The phase poles for the other two motor poles are unsaturated. Accordingly, they can be used to inductively sense the rotor position and provide this information to controller 18.

For the combined winding set configuration of FIG. 5, when set 10C is energized (phases A and B energized), sensing is achieved using the poles associated with windings of combined set 14C. When set 12C is energized, sensing is done with the poles associated with the windings of set 16C.

When set 14C is energized, sensing is achieved with the poles of the combined set 10C. And, when set 16C is energized, sensing is done with the poles associated with set 12C.

What has been described is a 2-on coil arrangement by which two phases of a polyphase switched inductance motor having three or more phases are energized at a particular time. It is a particular feature of the invention that windings from adjacent motor phases are connected together to form a combined set of windings. Consequently, energization of one of the windings in the combined set causes energization of the other winding, so that two phases are energized at the stone time. With this winding arrangement, motor flux is localized in the two motor phases whose windings are energized. The motor backiron on the other two phases is substantially unsaturated at this time. The unsaturated portion of the motor backiron can be used to inductively sense the motor's rotor position. Apparatus is provided to control energization of the combined sets of motor windings. The apparatus is responsive to sensed motor operating parameters, such as rotor position, to control switching between the various combined sets of windings. This enables more poles to be turned "on" and "off" with the same current, and the normal forces produced within the motor are now better distributed through the backiron. The apparatus is usable for low voltage phase switching using include low voltage inverters. During motor fabrication, motor connections are readily made to produce the combined sets of windings.

In view of the foregoing, it will be seen that the several objects of the invention are achieved and other advantageous results are obtained.

As various changes could be made in the above constructions without departing from the scope of the invention, it is intended that all the matter contained in the above description or shown in the accompanying drawings shall be interpreted as illustrative and not in a limiting sense.

Having thus described the invention, what is claimed and desired to be secured by Letters Patent is:

1. Apparatus for controlling switching of a polyphase switched reluctance motor having three or more phases comprising:
   a stator assembly including a stator having a plurality of stator poles spaced about the stator, and a rotor having a plurality of rotor poles, the pitch between respective stator poles and respective rotor poles being uniform;
   a pair of windings for each motor phase, there being two separate windings mounted on each stator pole with one of the windings for one motor phase and the other winding for a different motor phase, each of the windings being connected to another winding for the same pair of windings mounted on an opposite stator pole such that when a winding of said pair is energized, opposite magnetic poles are formed, the windings of each pair being equidistantly spaced from adjacent windings mounted on adjacent poles;
   means connecting together one winding from one pair of windings with one winding from an adjacent pair of windings to form a combined set of windings, the number of combined pairs of windings corresponding to the number of motor phases, connecting together adjacent windings in this manner producing a short magnetic flux path coupling between two motor phases when the windings comprising the combined pair of windings are energized;
   control means selectively energizing and de-energizing the combined pairs of windings in a predetermined sequence; and
   a switch means comprising a pair of switches connected to said control means for each motor phase, a combined pair of windings interposed between each switch of said switches where one winding of said combined pair of windings is associated with a different motor phase, whereby each of the windings in a combined pair of windings is mutually coupled to winding in an adjacent combined pair of windings whereby closing said pair of switched energizes a combined pair of windings to energize two motor phases, and opening said pair of switches transfers energy through the magnetic couplings to the next adjacent winding pair.

2. The apparatus of claim 1 wherein one winding from one pair of windings is serially connected to one winding from a different pair of windings to form the combined pair of windings, the respective windings connected together being from adjacent motor phases.

3. The apparatus of claim 2 further including stator mounted inductance sensing means for sensing rotor position through the terminals of unenergized motor phases.

4. The apparatus of claim 3 wherein the sensing means includes the unsaturated motor backiron associated with the poles of the stator for the phases of the motor which are not energized at any one time, the backiron associated with the stator poles for the energized phases being saturated when the phases are energized, and the rotor position being sensed by the backiron inductance produced by the rotation of the rotor.

5. Apparatus for controlling switching of a polyphase switched reluctance motor having three or more phases comprising:
   wrapping windings of sets of windings about poles of a stator assembly having a plurality of stator poles spaced thereabout, the pitch between respective stator poles being uniform, there being a set of windings for each motor phase with each set of windings including at least two separate windings both of which are wrapped around the same stator pole;
   equidistantly spacing the windings wrapped around one stator pole from windings wrapped around adjacent stator poles;
   producing a number of combined sets of windings corresponding to the number of motor phases by connecting together one winding from one set of windings with one winding from a different set of windings to form a combined set of windings such that when a winding of said pole is energized, opposite magnetic poles are formed;
   short path coupling the magnetic flux from one motor phase with the magnetic flux of another motor phase when the windings comprising a combined set of windings are energized;
   selectively energizing and de-energizing the combined sets of windings in a predetermined sequence by a control means by activating a first switch interposed between the control means and one of the windings comprising a combined set of windings and a second switch interposed between said control means and another winding of the combined set of windings for one winding of each set of windings to be associated with one motor phase and another winding to be associated with a different motor phase, the motor acting as if two phases are energized when both switches are activated in said combined set; and
   magnetically transferring energy directly between the combined set of windings during said selective de-energization and energization of the combined sets of windings, each winding in said combined sets of windings mutually coupled to a winding in a different combined set of windings.

6. The method of claim 5 further including selectively energizing and de-energizing the combined sets of windings in a predetermined sequence by which the motor is switched from one phase to the next.

7. The method of claim 6 further including inductively sensing the position of the rotor through the terminals of unenergized motor phases.

8. The method of claim 7 wherein rotor position sensing includes inductively sensing the position of the rotor using an unsaturated portion of the motor backiron which is associated with the poles of the stator and rotor for the phases of the motor which are not energized at a particular time, the backiron associated with the stator and rotor poles for the energized phases being saturated when the phases are energized.

9. A method for energizing phases in a switched reluctance motor having three or more phases comprising:

wrapping windings of a pair of windings for each motor phase around poles of a stator assembly having a plurality of stator poles spaced thereabout, each pair of windings wrapped around the same stator poles and mutually coupled by shared magnetic flux;

serially connecting one winding from each pair of windings comprising a motor phase with one winding from a pair of windings comprising the next adjacent motor phase to form combined pairs of windings, the number of combined pairs of windings corresponding to the number of motor phases;

each of the windings being connected to another winding for the same pair of windings mounted on an opposite stator pole;

selectively energizing and de-energizing the combined pairs of windings in a predetermined sequence by a control means by activating first and second switches interposed between the control means and each of said combined pairs of windings, the energizing of a combined pair energizing two phases of the motor and short-path coupling said phases; and transferring energy between windings of a de-energized combined pair of windings and an energized combined pair of windings by means of said mutual coupling.

10. The method of claim 9 further including serially connecting each of said combined pairs of windings between said first and second switches.

11. The method of claim 10 further including for the energization of each combined pair, simultaneously closing said first and second switches.

12. The method of claim 10 further including for the de-energization of each combined pair, simultaneously opening said first and second switches, electrically isolating said combined pair from said control means.

13. Apparatus for controlling switching of a polyphase switched reluctance motor having three or more phases and a stator assembly with a plurality of stator poles spaced thereabout, comprising:

a pair of windings for each motor phase, there being two separate windings mounted on each stator pole with one of the windings for one motor phase and the other winding for a different motor phase, both windings wrapped such that energization of a winding forms opposite magnetic poles on said stator, one winding from each pair of windings connected together with one winding from an adjacent opposite wound pair of windings to form combined pairs of windings, the number of combined pairs of windings corresponding to the number of motor phases, connecting together adjacent windings in this manner producing a short magnetic flux path coupling between two motor phases when a combined pair of windings is energized; and one winding from each pair of windings connected together with one winding form an adjacent opposite wound pair of windings to form a combined pair of windings, the number of combined pairs of windings corresponding to the number of motor phases, connecting together adjacent windings in this manner producing a short magnetic flux path coupling between two motor phases when a combined pair of windings is energized; and control means for selectively energizing and de-energizing the combined pairs of windings in a predetermined sequence, energy from a de-energizing combined pair of windings transferred to an energized combined pair of windings through a magnetic coupling between the combined pairs of windings.

14. The apparatus of claim 15 wherein said windings of said combined pair of windings are serially connected.

15. The apparatus of claim 13 wherein said control means includes a pair of switches for each combined pair of windings, said combined pair of windings interposed between the switches of said pair of switches, such that closing said pair of switches energizes said combined pair of windings, and opening said pair of switches de-energizes said combined pair of windings.

16. The apparatus of claim 13 wherein said magnetic coupling between the combined pairs of windings is the magnetic coupling between winding pairs wound on the same stator poles.

17. The apparatus of claim 13 further including inductance sensing means for sensing rotor position through the terminals of unenergized motor phases, the motor backiron associated with the stator poles of unenergized motor phases unsaturated due to the short magnetic flux path coupling between energized phases.

* * * * *